United States Patent
Lawson

(10) Patent No.: US 11,168,833 B2
(45) Date of Patent: Nov. 9, 2021

(54) STANDING HOOK

(71) Applicant: Peak Innovations Inc., Richmond (CA)

(72) Inventor: Craig Lawson, Burnaby (CA)

(73) Assignee: Peak Innovations Inc., Richmond (CA)

( * ) Notice: Subject to any disclaimer, the term of this patent is extended or adjusted under 35 U.S.C. 154(b) by 0 days.

(21) Appl. No.: 16/612,173

(22) PCT Filed: May 9, 2018

(86) PCT No.: PCT/CA2018/000092
§ 371 (c)(1),
(2) Date: Nov. 8, 2019

(87) PCT Pub. No.: WO2018/205011
PCT Pub. Date: Nov. 15, 2018

(65) Prior Publication Data
US 2021/0080052 A1    Mar. 18, 2021

Related U.S. Application Data

(60) Provisional application No. 62/503,607, filed on May 9, 2017.

(51) Int. Cl.
| | |
|---|---|
| *F16M 11/00* | (2006.01) |
| *F16M 13/00* | (2006.01) |
| *A45F 3/44* | (2006.01) |
| *A47G 7/04* | (2006.01) |

(52) U.S. Cl.
CPC ............... *F16M 13/00* (2013.01); *A45F 3/44* (2013.01); *A47G 7/044* (2013.01)

(58) Field of Classification Search
CPC .... F16M 13/00; F16M 2200/00; F16M 11/04; A47G 7/042
See application file for complete search history.

(56) References Cited

U.S. PATENT DOCUMENTS

| | | | |
|---|---|---|---|
| D392,141 S * | 3/1998 | Cavanaugh ............ | A01G 9/024 D20/41 |
| D392,853 S | 3/1998 | Hardison | |
| D443,153 S | 6/2001 | Thomas | |
| 6,490,823 B1 * | 12/2002 | Ibarra .................... | A01K 97/10 248/512 |
| 6,588,723 B1 * | 7/2003 | Moran, III ............. | A01K 39/00 248/156 |
| D554,478 S * | 11/2007 | Robinson ............... | A01K 39/00 D8/356 |
| D637,833 S * | 5/2011 | Russell .................. | A01K 97/10 D6/405 |

(Continued)

*Primary Examiner* — Amy J. Sterling
(74) *Attorney, Agent, or Firm* — Smiths IP; Lawrence Chan

(57) ABSTRACT

A standing hook comprises a substantially hollow upright member, a cap, a support member, and a hook portion. The upright member comprises first and second ends, with the second end being configured to be inserted into the ground. The cap is attached to, and covers, the first end. The support member is rigidly attached to the upright member between the first and second ends. The hook portion extends from the upright member and comprises one or more structural portions. At least one of the structural portions comprises a hook for supporting one or more objects. The hook portion is substantially solid.

21 Claims, 4 Drawing Sheets

(56) References Cited

U.S. PATENT DOCUMENTS

| | | | | |
|---|---|---|---|---|
| 9,252,311 B2* | 2/2016 | Wolter | .................... | H02S 30/10 |
| D814,909 S * | 4/2018 | Lawson | ........................ | D8/367 |
| 10,154,630 B2* | 12/2018 | Bryant | ................... | A01G 9/024 |
| 2007/0084975 A1 | 4/2007 | Steiger | | |
| 2008/0265230 A1* | 10/2008 | Farmer | .................... | A01K 3/00 |
| | | | | 256/12 |

* cited by examiner

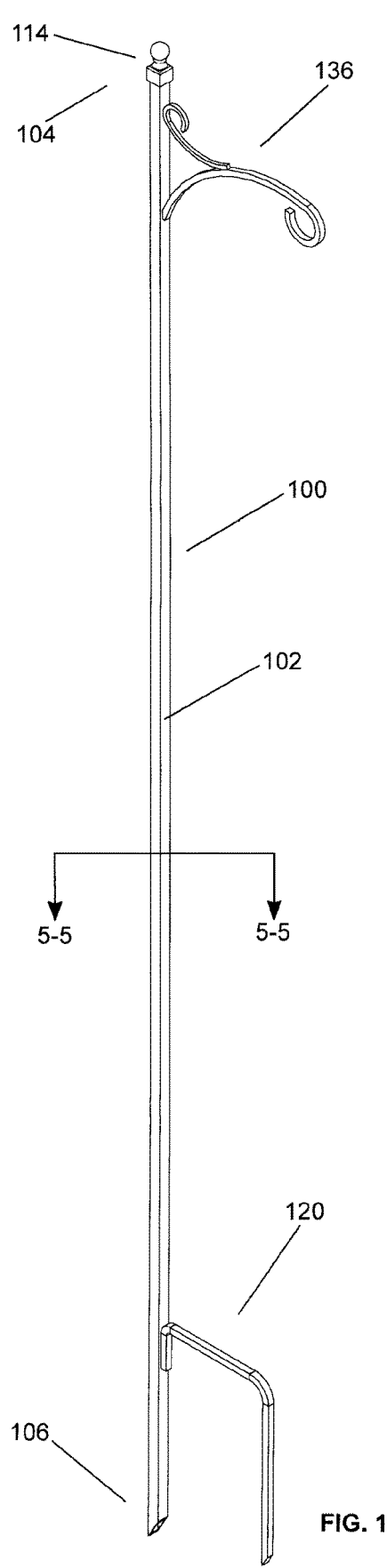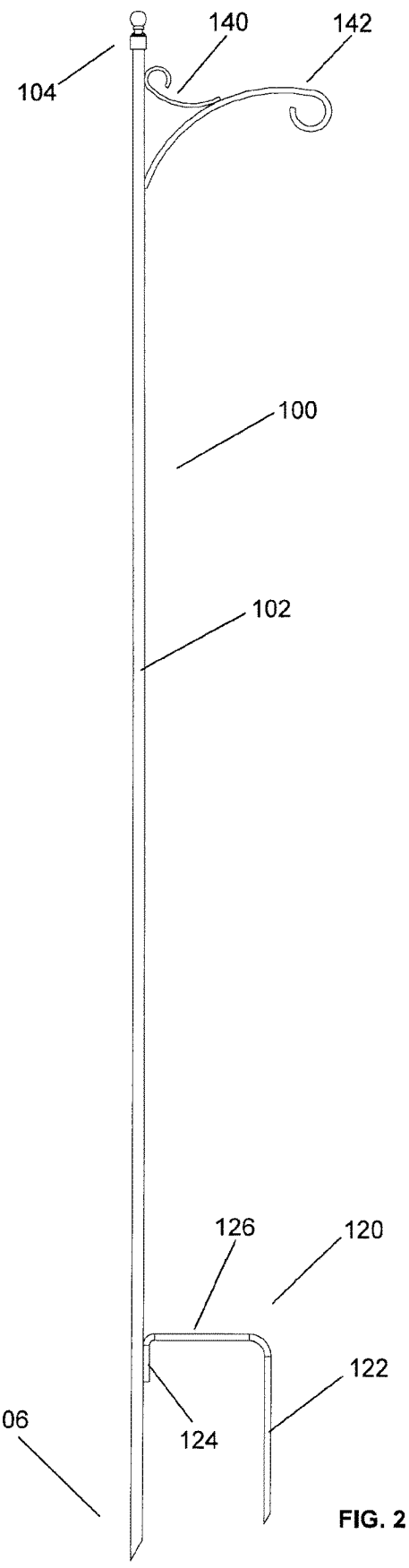
FIG. 1
FIG. 2

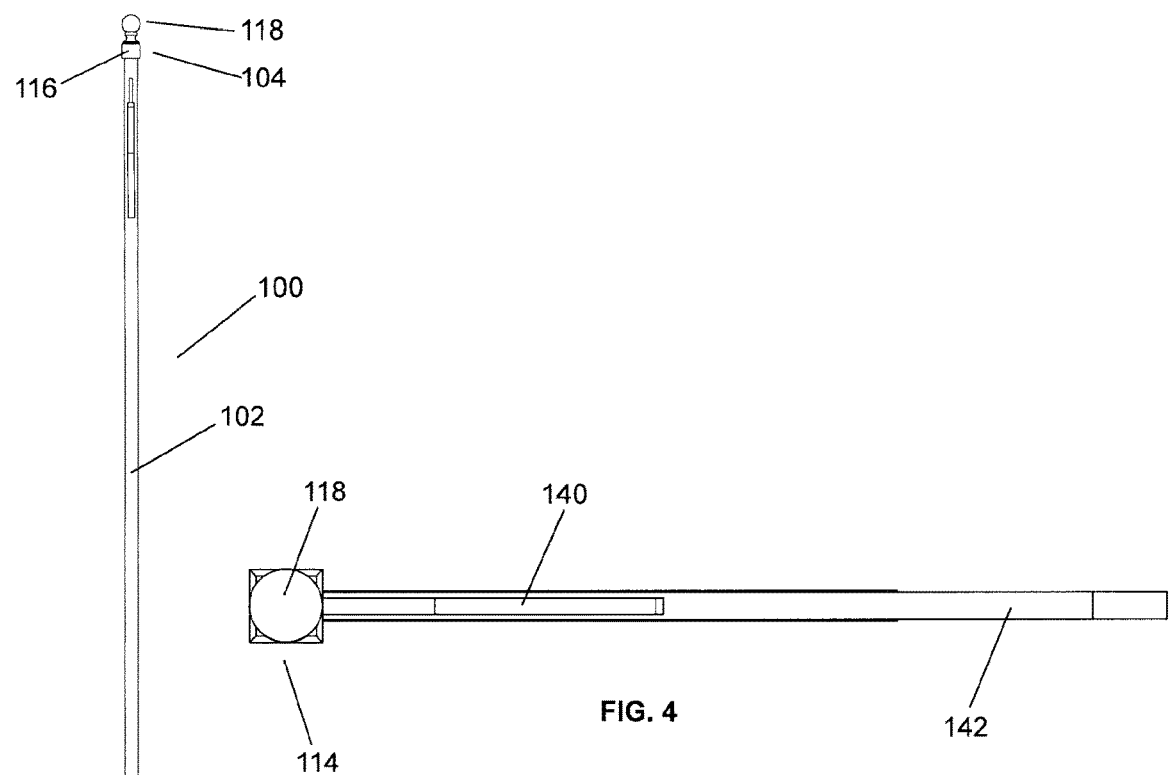
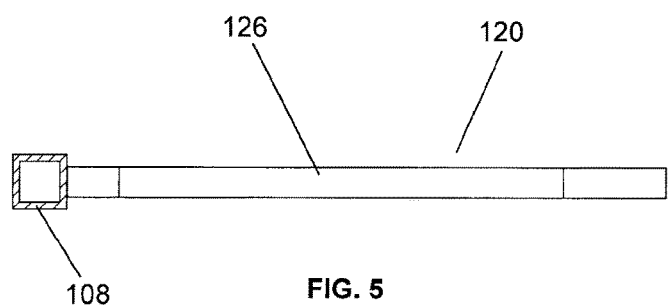
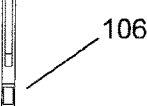
FIG. 3
FIG. 4
FIG. 5

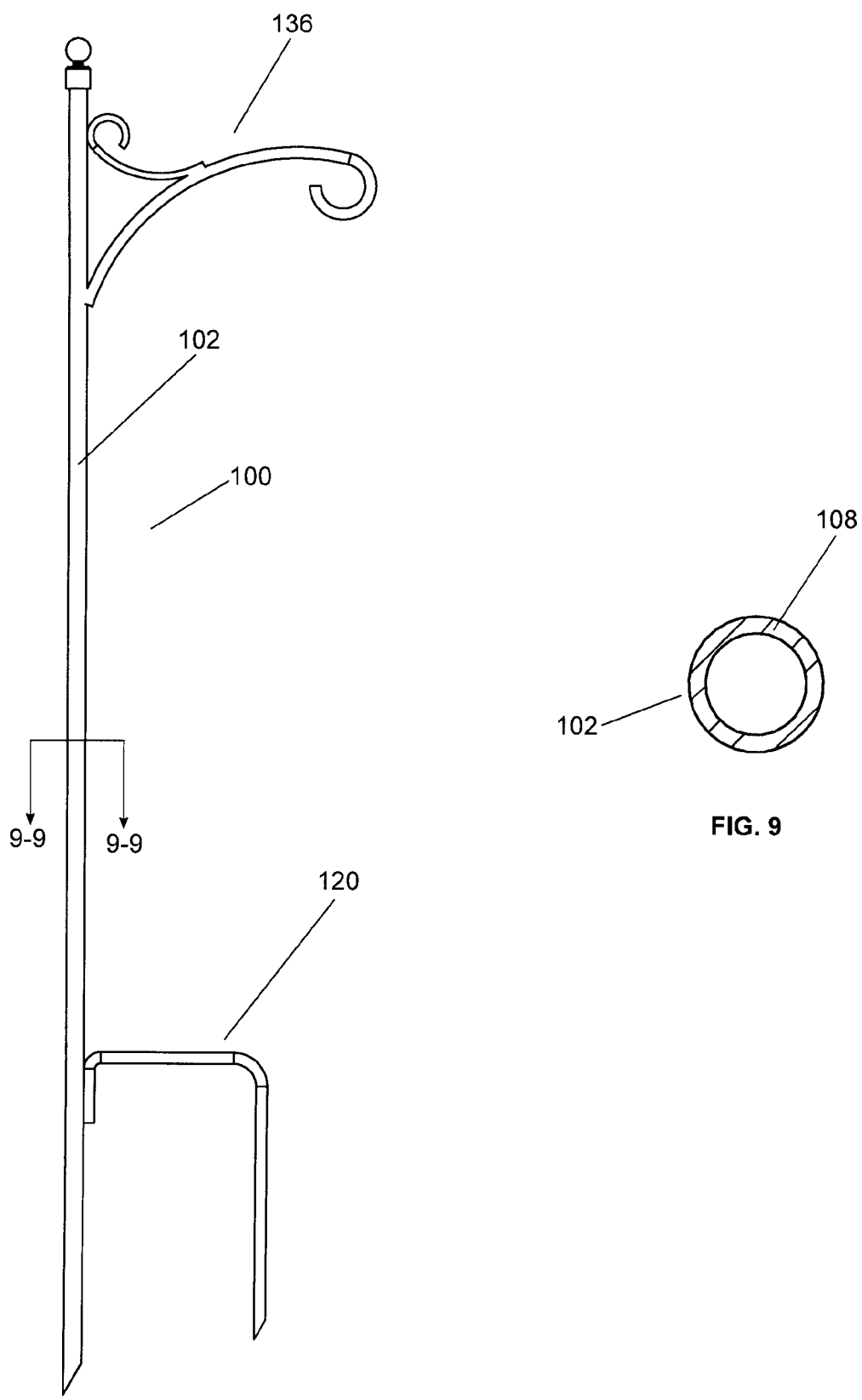
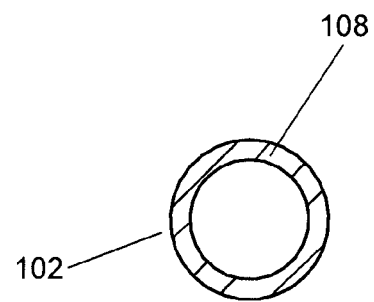
FIG. 9
FIG. 8

STANDING HOOK

FIELD OF THE INVENTION

The present invention relates to structures for hanging objects, and, in particular, to a standing hook with improved strength.

BACKGROUND OF THE INVENTION

Standing hooks are commonly used for supporting hanging objects, such as flower pots or lanterns. One type of standing hook is a shepherd's hook, which typically comprises a long, narrow vertical member with a curved member extending from the top. The curved member comprises one or more hooks for supporting a hanging object.

One drawback of a traditional standing hook is that the long, narrow vertical member is subject to break or deform when used to support heavier objects. Therefore, it is desirable for a standing hook to have increased strength, while still maintaining the appearance of a traditional standing hook.

SUMMARY OF THE INVENTION

In accordance with one embodiment of the invention, a standing hook comprises a substantially hollow upright member, a cap, a support member, and a hook portion. The upright member comprises first and second ends, with the second end being configured to be inserted into the ground. The cap is attached to, and covers, the first end. The support member is rigidly attached to the upright member between the first and second ends. The hook portion extends from the upright member and comprises one or more structural portions. At least one of the structural portions comprises a hook for supporting one or more objects. The hook portion is substantially solid.

In another embodiment, the support member comprises a central member with first and second legs extending from the central member. The first leg is configured to be inserted into the ground, and the second leg is rigidly attached to the upright member.

In yet another embodiment, the first and second legs extend substantially perpendicularly from the central member.

In still yet another embodiment, the support member is substantially solid.

In a further embodiment, the upright member comprises an angled portion proximate to the second end, with the second end terminating to a terminal edge.

In yet a further embodiment, the first leg comprises an angled portion proximate to an end of the first leg, with the end terminating to a terminal edge.

In still yet a further embodiment, the cap comprises an attachment portion and one or more cap elements. The attachment portion is configured to fit onto the first end. The one or more cap elements are attached to the attachment portion, with the one or more cap elements preventing water and other substances from entering the upright member through the first end.

In still a further embodiment, the one or more cap elements comprise a bulb.

In yet a further embodiment, at least a portion of the cap is made from a corrosion-resistant material.

In another embodiment, the hook portion comprises two structural portions.

In yet another embodiment, at least a portion of each of the two structural portions is curved.

In still yet another embodiment, each of the two structural portions are rigidly attached to the upright member.

In a further embodiment, the two structural portions are rigidly attached to each other.

In another embodiment, the upright member may have a substantially rectangular, square, round, or circular cross-section.

In yet another embodiment, the support member may have a substantially rectangular, square, round, or circular cross-section.

In still yet another embodiment, the one or more structural portions may have a substantially rectangular, square, round, or circular cross-section.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The embodiments of the invention will be described by reference to the drawings thereof, in which:

FIG. 1 is a perspective view of a standing hook in accordance with one embodiment of the invention;

FIG. 2 is a front view of the standing hook of FIG. 1;

FIG. 3 is a side view of the standing hook of FIG. 1;

FIG. 4 is a top view of the standing hook of FIG. 1;

FIG. 5 is a cross-sectional view of the standing hook of FIG. 1, taken along line 5-5;

FIG. 8 is a front view of a standing hook in accordance with a second embodiment of the invention; and FIG. 9 is a cross-sectional view of the standing hook of FIG. 8, taken along line 9-9.

DETAILED DESCRIPTION OF THE INVENTION

Referring to FIGS. 1 to 7, a standing hook 100 in accordance with one embodiment of the invention comprises a generally upright member 102 comprising first and second ends 104, 106. Preferably, the upright member 102 is hollow, as best shown in the cross-sectional view of the upright member 102 in FIG. 5. In the embodiment shown in FIGS. 1 to 7, a wall 108 of the upright member 102 defines a generally square cross-section. However, other shapes (e.g. rectangular, polygonal, etc.) for the cross-section of the upright member 102 are also possible.

Figure 6:
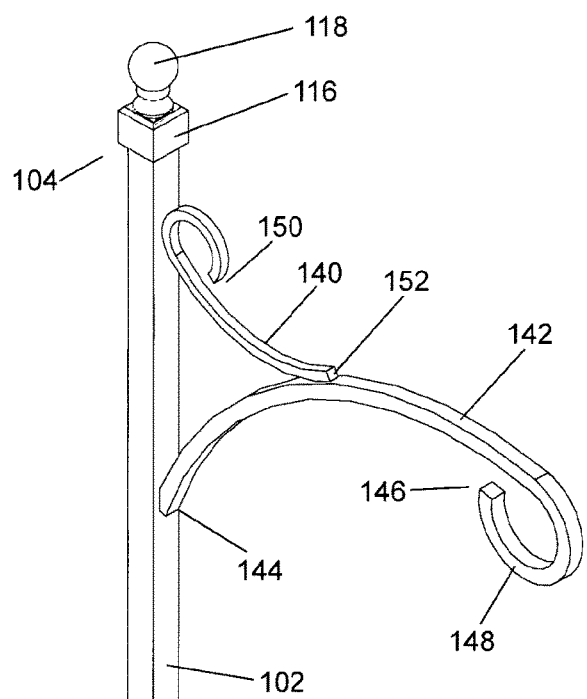
FIG. 6 is a partial view of the standing hook of FIG. 1.
Figure 7:
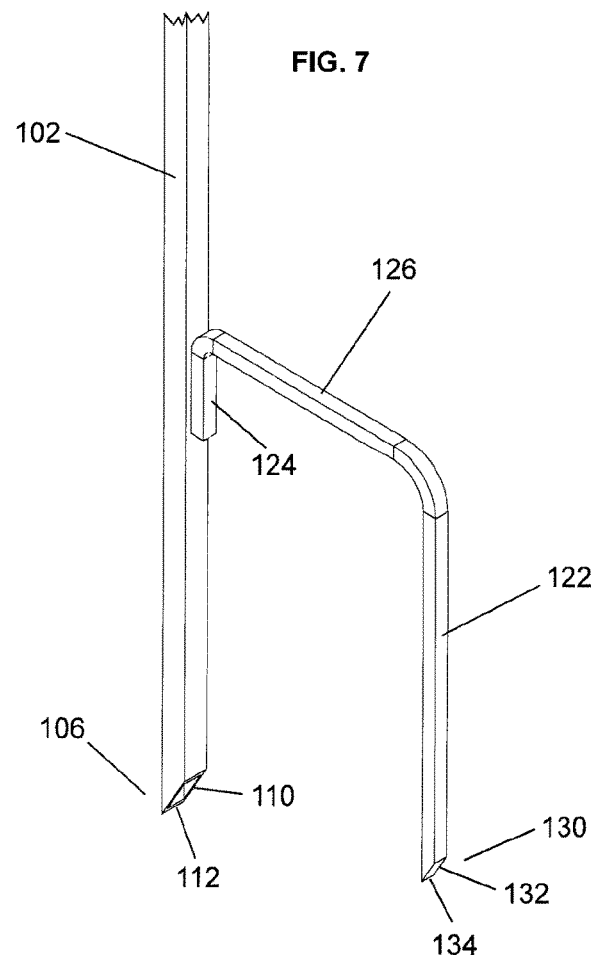
FIG. 7 is another partial view of the standing hook of FIG. 1.

The second end 106 is adapted to be inserted into the ground. Preferably, a portion of the upright member 102 proximate to the second end 106 is angled or tapered to facilitate this insertion. For example, in the embodiment shown in FIGS. 1 to 7, the upright member 102 proximate to the second end 106 comprises an angled portion 110 such that the second end 106 terminates to a terminal edge 112 (as best shown in FIG. 7, a partial view of the lower portion of the standing hook 100). The upright member 102 may be made from metal (such as iron) or from any other suitable material.

Because the upright member 102 is preferably hollow, a cap 114 may be fitted onto and covering the first end 104 in order to prevent water or other substances from entering into the interior of the upright member 102. Water entering into the upright member 102 may cause corrosion of the upright member, resulting in structural failure. As best shown in FIG. 6 (a partial view of the upper portion of the standing hook 100), the cap 114 may comprise an attachment portion 116 at one end that is sized to fit over and around the first end 104. In addition, the cap 114 may also comprise one or more cap elements 118 attached to the attachment portion 116. The cap elements 118 may include, for example, the bulb shown in FIG. 6. The cap 114, or at least a portion thereof, is preferably made from aluminum but may also be made from stainless steel or any other corrosion-resistant material. In one embodiment, the cap 114 may be rigidly affixed to the first end 104 by welding. In other embodiments, the cap 114 may be removably attached, such as by being screwed on or attached using one or more suitable fasteners (e.g. screws, rivets, bolts, etc.).

The standing hook 100 further comprises a support member 120 extending from the upright member 102. In the embodiment shown in FIGS. 1 to 7, the support member 120 is generally U-shaped, comprising first and second legs 122, 124 extending from a central member 126. Preferably, both the first and second legs 122, 124 extend substantially perpendicularly from the central member 126. The support member 120 is preferably solid (i.e. not hollow) and may have a generally square cross-section. However, other shapes (e.g. rectangular, polygonal, etc.) for the cross-section of the support member 120 are also possible. The support member 120 may be made from metal (such as iron) or from any other suitable material and may comprise a unitary piece that is bent to form its final shape.

The second leg 124 is preferably rigidly affixed to the upright member 102, such as by welding, at a location on the upright member 102 that is closer to the second end 106 than the first end 104. The first leg 122 comprises a leg end 130 that is adapted to be inserted into the ground. Preferably, a portion of the first leg 122 proximate to the leg end 130 is angled or tapered to facilitate this insertion. For example, in the embodiment shown in FIGS. 1 to 7, the first leg 122 proximate to the leg end 130 comprises a leg angled portion 132 such that the leg end 130 terminates in a terminal leg edge 134 (as best shown in FIG. 7).

In another embodiment, the support member 120 may only comprise the first leg 122 and the central member 126. In this embodiment, the central member 126 is directly affixed to the upright member 102.

Referring to FIG. 6, a hook portion 136 extends from the upright member 102, preferably at a location on the upright member 102 that is closer to the first end 104 than the second end 106. The hook portion 136 may comprise one or more structural portions 138. In the embodiment shown in FIGS. 1 to 7, the structural portions 138 include upper and lower structural portions 140, 142 that are generally curved in shape. The upper structural portion 140 is relatively smaller in size than the lower structural portion 142, although this is not necessarily required.

The lower structural portion 142 comprises first and second lower portion ends 144, 146. The lower structural portion 142 is rigidly affixed to the upright member 102, such as by welding, at or proximate to the first lower portion end 144. A hook 148 is preferably formed on the lower structural portion 142 at or proximate to the second lower portion end 146. The hook 148 is configured to support a hanging object (not shown), such as a flower pot or the like.

The upper structural portion 140 comprises first and second upper portion ends 150, 152. The upper structural portion 140 is rigidly affixed to the lower structural portion 142, such as by welding at or proximate to the second upper portion end 152. The upper structural portion 140 is rigidly affixed to the upright member 102, such as by welding, at or proximate to the first upper portion end 150. In this manner, the upper structural portion 140 is able to provide additional support to the lower structural portion 142.

In the embodiment shown in FIGS. 1 to 7, the upper and lower structural portions 140, 142 are preferably solid (i.e. not hollow) and may be made from metal (such as iron) or from any other suitable material. In addition, the upper and lower structural portions 140, 142 may have a generally square cross-section. However, other shapes (e.g. rectangular, polygonal, etc.) for the cross-section of the upper and lower structural portions 140, 142 are also possible.

Although the hook portion 136 shown in FIG. 6 comprises two structural portions 138, it is understood that other arrangements and numbers of structural portions 138 are also possible. Furthermore, in other embodiments, the hook member 136 may comprise largely angular structural portions 138 (rather than curved). In addition, more than one of the structural portions 138 may comprise the hook 148 such that objects may be hung from different locations on the hook portion 136.

The standing hook 100 may be used as follows. The standing hook 100 is inserted into the ground by implanting the second end 106 and the leg end 130 into the soil, dirt, gravel, etc. in a substantially vertical orientation. Once the standing hook 100 is securely implanted into the ground, one or more hanging objects may be hung from the hook portion 136.

The use of a generally hollow upright member 102 increases the relative strength and hanging ability of the standing hook 100.

In addition, because the upright member 102 preferably has a square (or rectangular) cross-section, the attachment of the upper and lower structural portions 140, 142 to the upright member 102 is made easier since the upper and lower structural portions 140, 142 may be welded to a flat surface (formed by a portion of the wall 108).

FIGS. 8 and 9 depict another embodiment of the standing hook 100. In this embodiment, the upright member 102, support member 120, and the hook portion 136 have a generally round cross-section (as opposed to a generally square or otherwise polygonal cross-section). For example, FIG. 9 depicts a cross-sectional view of the upright member 102 of this embodiment, and it shows a generally circular cross-section defined by the wall 108.

It will be appreciated by those skilled in the art that the preferred embodiment has been described in some detail but that certain modifications may be practiced without departing from the principles of the invention.

The invention claimed is:

1. A standing hook comprising:
a hollow upright member comprising first and second ends, wherein the second end is configured to be inserted into the ground;
a cap attached to, and covering, the first end;
a support member rigidly attached to the upright member between the first and second ends; and
a hook portion extending from the upright member, wherein the hook portion comprises one or more structural portions, wherein at least one of the structural portions comprises a hook for supporting one or more objects, wherein all of the structural portions are solid and not hollow, and wherein all of the structural portions have a square cross-section.

2. The standing hook of claim 1, wherein the support member comprises:
a central member; and
first and second legs extending from the central member, wherein the first leg is configured to be inserted into the ground, and wherein the second leg is rigidly attached to the upright member.

3. The standing hook of claim 2, wherein the first and second legs extend perpendicularly from the central member.

4. The standing hook of claim 1, wherein the support member is solid and not hollow.

5. The standing hook of claim 1, wherein the upright member comprises an angled portion proximate to the second end, and wherein the second end terminates to a terminal edge.

6. The standing hook of claim 2, wherein the first leg comprises an angled portion proximate to an end of the first leg, and wherein the end terminates to a terminal edge.

7. The standing hook of claim 1, wherein the cap comprises:
an attachment portion configured to fit onto the first end; and
one or more cap elements attached to the attachment portion, wherein the one or more cap elements prevent water and other substances from entering the upright member through the first end.

8. The standing hook of claim 7, wherein the one or more cap elements comprise a bulb.

9. The standing hook of claim 1, wherein at least a portion of the cap is made from a corrosion-resistant material.

10. The standing hook of claim 1, wherein the hook portion comprises two structural portions.

11. The standing hook of claim 10, wherein at least a portion of each of the two structural portions is curved.

12. The standing hook of claim 11, wherein each of the two structural portions are rigidly attached to the upright member.

13. The standing hook of claim 12, wherein the two structural portions are rigidly attached to each other.

14. The standing hook of claim 1, wherein the upright member has a rectangular cross-section.

15. The standing hook of claim 14, wherein the upright member has a square cross-section.

16. The standing hook of claim 1, wherein the upright member has a round cross-section.

17. The standing hook of claim 16, wherein the upright member has a circular cross-section.

18. The standing hook of claim 1, wherein the support member has a rectangular cross-section.

19. The standing hook of claim 18, wherein the support member has a square cross-section.

20. The standing hook of claim 1, wherein the support member has a round cross-section.

21. The standing hook of claim 20, wherein the support member has a circular cross-section.

* * * * *